US011323179B2

(12) United States Patent
Ye (10) Patent No.: US 11,323,179 B2
(45) Date of Patent: May 3, 2022

(54) TESTING METHOD FOR OPTICAL COMMUNICATION MODULE, AND TEST DEVICE (71) Applicant: SHANGHAI LIAOYUN INFORMATION TECHNOLOGY CO., LTD., Shanghai (CN)

(72) Inventor: Xiuxiu Ye, Shanghai (CN)

(73) Assignee: SHANGHAI LIAOYUN INFORMATION TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/170,949

(22) Filed: Feb. 9, 2021

(65) Prior Publication Data
US 2021/0242937 A1 Aug. 5, 2021

Related U.S. Application Data (63) Continuation-in-part of application No. PCT/CN2019/072537, filed on Jan. 21, 2019.

(51) Int. Cl.
H04B 10/07 (2013.01)
H04B 10/079 (2013.01)
H04L 1/00 (2006.01)

(52) U.S. Cl.
CPC ....... H04B 10/07953 (2013.01); H04B 10/07 (2013.01); H04L 1/0042 (2013.01)

(58) Field of Classification Search
None
See application file for complete search history.

(56) References Cited

U.S. PATENT DOCUMENTS 6,297,897 B1 * 10/2001 Czichy ............... H04B 10/118
 398/122
6,891,803 B1 * 5/2005 Chang ................... H04L 43/50
 348/192

(Continued)

FOREIGN PATENT DOCUMENTS

CN 104461565 A 3/2015
CN 105547644 * 5/2016 ............ G01M 11/00
CN 105547644 A 5/2016

OTHER PUBLICATIONS

International Search Report and Written Opinion of the International Searching Authority, issued in PCT/CN2019/072537, dated Jun. 10, 2019 ISA/JP.

Primary Examiner — Li Liu
(74) Attorney, Agent, or Firm — Brooks Kushman P.C.

(57) ABSTRACT

The present disclosure provides a testing method for optical communication module, and a test device. The testing method includes: reading encoded information from the optical communication module to be tested; obtaining a pre-stored optimal test parameter corresponding to the optical communication module, and adjusting test parameter configuration of test device accordingly to the optimal test parameter; obtaining test mode configuration, and performing a test on the optical communication module to obtain first test result; and obtaining a determination result according to the first test result and expected result. This method improves test efficiency and proposes a test device which emulates the estimated common performance characteristics of the main stream networking devices where the optical communication module attaches to in real-life applications, therefore, a qualified module passing the proposed test method has much lower possibility of having the interoperability issue mentioned in the background of the present disclosure.

9 Claims, 4 Drawing Sheets (56) References Cited

U.S. PATENT DOCUMENTS

| | | | | |
|---|---|---|---|---|
| 7,889,988 | B2* | 2/2011 | Tazawa | H04L 43/50 |
| | | | | 398/9 |
| 8,798,456 | B2* | 8/2014 | Skirmont | H04B 10/0793 |
| | | | | 398/9 |
| 9,800,330 | B1* | 10/2017 | Yusuf | G02B 6/4292 |
| 10,230,459 | B2* | 3/2019 | Courter | H04B 10/0791 |
| 2003/0048756 | A1* | 3/2003 | Chang | H04L 43/50 |
| | | | | 370/252 |
| 2007/0072451 | A1 | 3/2007 | Tazawa et al. | |
| 2017/0324473 | A1* | 11/2017 | Yusuf | G02B 6/4215 |
| 2018/0234174 | A1* | 8/2018 | Courter | H04B 10/0795 |

\* cited by examiner

TESTING METHOD FOR OPTICAL COMMUNICATION MODULE, AND TEST DEVICE

CROSS REFERENCE TO RELATED APPLICATION

This application is a continuation-in-part of PCT patent application Serial No. PCT/CN2019/072537, with an international filing date of Jan. 21, 2019, the disclosure of which is incorporated herein by reference in entirety.

TECHNICAL FIELD

The present disclosure relates to the technical field of optical communication, and particularly relates to a testing method for optical communication module and a test device.

BACKGROUND

Optical communication module usually includes types of optical module and electrical module (e.g., Direct Attach Cable). In existing manufacture and test procedure of optical communication module, there are multiple types of expensive test equipment involved, such as bit error rate tester, oscilloscope and traffic analyzer, and each handles one aspect of test. These equipment have to be coordinated and combined in order to complete the test for optical communication module. The optical communication modules under test have to be plugged into each type of the test equipment, run a specific aspect of test, plugged out and repeat multiple times to go through all the mentioned equipment in order to complete the test. The test efficiency can be greatly improved if the mentioned test aspects can be streamlined and implemented into a highly integrated test device.

Optical communication modules usually work by attaching to various networking devices in real-life applications. There is an interoperability challenge that a manufacturer qualified and MSA (Multi-Source Agreement) compliant optical communication module may work well at some networking devices from system vendor A but may not work well at other devices from system vendor B. This interoperability challenge may even exist among different types of devices from same vendor as well. The specific phenomena could include but are not limited to unstable link, bit error, frame loss or errors.

For the sake of the challenge, ideally, the optical communication module should be tested and qualified at each networking device where the module attaches to in real-life applications. Given the wide variety of the networking devices and associated costs, the ideal case is infeasible from practical prospective. A practical way is hereby proposed that the optical communication module is to be tested in a test device which quite emulates the estimated common performance characteristics of the main stream networking devices where the optical communication module is expected to be attached in real-life applications. Therefore, a qualified module passing the proposed test method has much lower possibility of having the interoperability issue mentioned above.

SUMMARY

In view of this, the present disclosure provides a testing method for optical communication module, and a test device, which aims at dramatically improving the test efficiency, associated cost and the interoperability challenge in real-life applications.

In the first aspect, the embodiments of the present disclosure provides a testing method for optical communication module, performed on a test device, and including:

plugging-in a plurality of optical communication modules to the test device at one time and going through the following test for all optical communication modules simultaneously;

obtaining encoded information by reading from the optical communication module;

obtaining a pre-stored optimal test parameter corresponding to the optical communication module to be tested and setting up the test parameter according to the obtained optimal test parameter; wherein the test parameter is set to match the optimal test parameter exactly for normal test or purposely deviates from the optimal test parameter when measuring the margin range of interoperability;

adjusting the test parameters, determining the optimal test parameter and storing the optimal test parameter into test device's database, if the optimal test parameter corresponding to the optical communication module to be tested does not exist.

obtaining test mode configuration, and performing a test on the optical communication module, according to the test mode configuration and the test parameter configuration, to obtain first test result information, wherein the first test result information includes a bit error rate and frame loss ratio; and obtaining a determination result and margin range according to the first test result information and expected result information, wherein the expected result information includes an expected bit error rate and frame loss ratio wherein there is an unique optimal test parameter corresponding to each type and model of optical communication module and stored in database of the test device. The variety of SerDes characteristics from various networking devices is the key factor introducing the interoperability challenge mentioned in the background of the present disclosure. The optimal test parameter sets up the test interfaces of the test device to emulate the estimated common SerDes characteristics of major networking devices which the optical communication module is expected to attach to in real-life applications.

In the second aspect, the embodiments of the present disclosure provide a test device, including a memory, a processor, an ASIC or FPGA programmed for traffic generation, reception and analysis, a plurality of test interfaces attaching with the host sides of optical communication modules to be tested, a computer program stored in the memory and executable on the processor, wherein the processor is configured to execute the computer program so as to implement the testing method for optical communication module mentioned in the first aspect or mentioned in any possible implementation mode of the first aspect.

The test device integrates the test functions, e.g., bit error rate test, frame loss ratio test, digital eye generation and module coding/programming, which used to require multiple different types of test or manufacture equipment. The CAPEX spent on various test equipment are greatly saved. Furthermore, the optical communication module only requires to be plugged-in and plugged-out once. Time consuming and duplicated manual operations across various test equipment are prevented and the test efficiency is improved.

The test device further emulates the estimated common SerDes characteristics of major networking devices which the optical module is expected to work with in real-life applications. Therefore, the test result reflects the module's performance in real-life applications to some extent and a qualified module passing the proposed test method has much lower possibility of having the interoperability issue mentioned in the background part of the present disclosure.

Additionally, the method to measure the margin range of optical communication module is proposed. The test device can measure the margin range of the optical communication module under test and use it as degree indicator of interoperability.

BRIEF DESCRIPTION OF THE DRAWINGS

In order to explain the embodiments of the present disclosure or the technical solutions in the prior art more clearly, a brief introduction regarding the accompany drawings is provided below; it is apparent that the accompany drawings described herein are only some examples of the present disclosure, the person of ordinary skill in the art may also get other drawings according to the current drawings without putting creative effort.

DESCRIPTION OF THE EMBODIMENTS

In the following description, in order to describe but not intended to limit the present disclosure, concrete details such as specific system structure, technique, and the like are proposed, so that a comprehensive understanding of the embodiments of the present disclosure is facilitated. However, it will be apparent to the ordinarily skilled one in the art that, the present disclosure may also be implemented in some other embodiments without these concrete details. In some other conditions, detailed explanations of method, circuit, device and system well known to the public are omitted, so that unnecessary details may be prevented from obstructing the description of the present disclosure.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should also be understood that, terms used in the description of the present disclosure are for the purpose of describing specific embodiments but not intended to limit the present disclosure. As is used in the description and the annexed claims of the present disclosure, unless other conditions are indicated clearly in the context, otherwise, singular forms of terms such as "a", "one", "the" are intended to include plural forms.

It should be further understood that, terms "and/or" used in the description and the annexed claims of the present disclosure are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Furthermore, terms of "the first", "the second" and "the third" are only used for distinguishing the description, and should not be interpreted as indicating or implying relative importance.

Embodiment One

Figure 1:
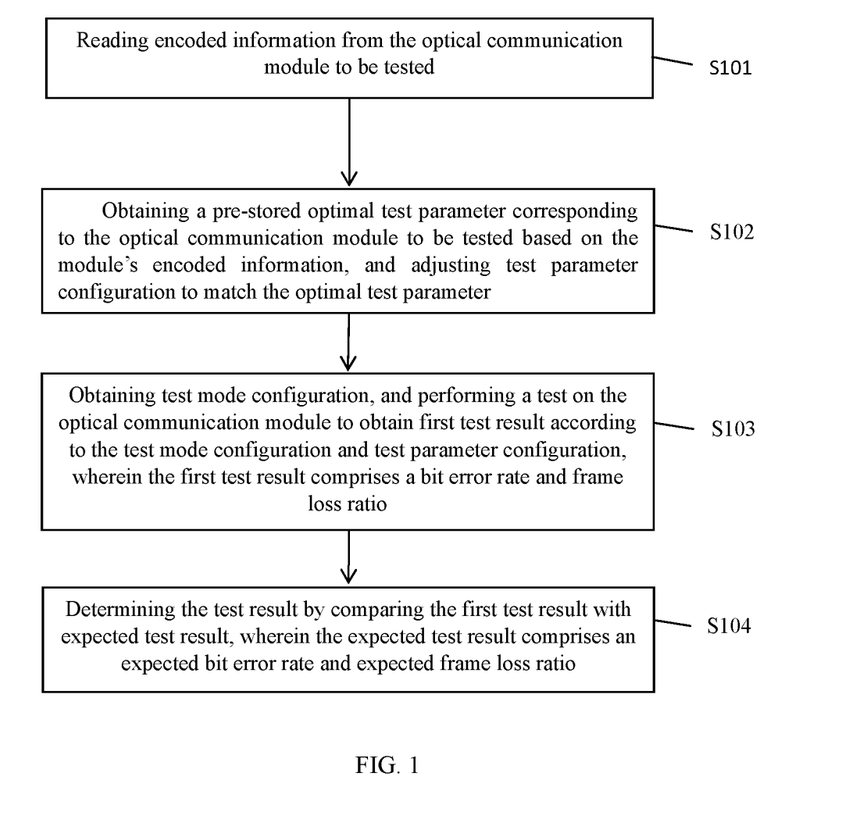
FIG. 1 illustrates a schematic flow chart of an implementation process of the first testing method for optical communication module according to the present disclosure.

FIG. 1 illustrates a schematic flow chart of a first testing method for optical communication module according to an embodiment of the present disclosure. An execution object of the testing method for optical communication module according to the embodiment of the present disclosure is a test device. The device is preferably a device having a webGUI user interface, as described below:

In step S101, reading encoded information from the optical communication module to be tested.

The encoded information of the optical communication module is stored in a memory such as an EEPROM storage element of the optical communication module. The encoded information generally includes a manufacturer name, a component number, a serial number, manufacturing information such as a date of manufacture, and model information such as package types, a transmission rate, and the like. The package types include SFP, SFP+, QSFP, QSFP 28, SFP, QSFP-DD, etc., the transmission rate includes 10 Gbit/S, 25 Gbit/s, 50 Gbit/s, 100 Gbit/s, 200 Gbit/s, 400 Gbit/s, etc.

In step S102, obtaining a pre-stored optimal test parameter corresponding to the optical communication module to be tested based on the module's encoded information, and adjusting test parameter configuration to match the optimal test parameter Different types of optical communication modules have different electrical/optical characteristics and different application scenarios, the corresponding test parameter configurations at the test device is different, wherein the test parameters may include a test interface protocol, a transmission voltage amplitude and finite impulse response filters setting at the transmitter of the test interface, an equalization parameter at the receiver of the test interface, and the like. The test device correspondingly stores a set of optimal test parameters for each type or model of optical communication module, an optimal test parameter may be obtained by lookup a matching table between model information and optimal test parameters stored in a database according to the encoded information of optical communication module, and the test parameter configuration of the test device is automatically adjusted according to the optimal test parameter.

In step S103, obtaining test mode configuration, and performing a test on the optical communication module to obtain first test result information according to the test mode configuration and the test parameter configuration, wherein the first test result information includes a bit error rate and and frame loss ratio.

The test mode configuration of optical communication module in this embodiment includes an Ethernet traffic test mode and a pseudo-random binary sequence stream test mode, the test mode configuration determines which test mode the test device is performing. In the Ethernet traffic test mode, the test device generates a line-rate Ethernet packet data stream, and sends the Ethernet packet data stream to the optical communication module to be tested through the transmitter of its test interface; alternatively, in the pseudo-random binary sequence mode, the test device generates a pseudo-random binary sequence stream, and sends the pseudo-random binary sequence stream to the optical communication module to be tested through the transmitter of its test interface. Optionally, the step of obtaining the test mode configuration further includes receiving an instruction for selecting a test mode, and setting test mode configuration.

Testing the optical communication module is performed according to the current test mode and the test parameters configuration in the step S102. The first test result information may be obtained after a preset test duration is completed, wherein the first test result information includes bit error rate and frame loss ratio. Specifically, during testing, the Ethernet packet data stream or the pseudo-random binary sequence stream generated by the test device is transmitted to the optical communication module through the transmitter of the test interface, the optical communication module circles back the Ethernet packet data stream or the pseudo-random binary sequence stream to the receiver of the testing device under the connection topology of single-port loopback or port-pair, and the test device obtains the bit error rate and frame loss ratio of the optical communication module under test by comparing the quantity and information content between the originally generated Ethernet packet data stream (or pseudo-random binary sequence) and the received Ethernet packet data stream (or pseudo-random binary sequence) circled back by the optical communication module.

Loopback connection refers to connecting the module's transmitter with its receiver to form a loop. In case of an optical module, a loopback connection may be implemented through optical fiber; in case of an Direct Attached Cable, loopback may be implemented through an electric cable.

Port-pair connection refers to two interconnected optical communication modules, that is, the transmitter of the first optical communication module is connected with the receiver of the second optical communication module, and the receiver of the first optical communication module is connected with a transmitter of the second optical communication module, in case of the optical modules, the modules are interconnected by optical fiber; in case of the Direct Attached Cable, the modules are interconnected through a cable.

Optionally, the method further includes receiving a test duration instruction to set a test duration, before performing a test on the optical communication module.

Optionally, the method further includes storing the first test result information, test time, the encoded information of the optical communication module into the database after the step S103, so as to facilitate future queries of the test log at the test device.

Optionally, during test, the temperature of current environment may be recorded, in this case, the first test result contains environmental temperature information, which facilitates analyzing the influence of the temperature change to the optical communication module under test.

In step S104, obtaining a determination result according to the first test result information and the expected result information, wherein the expected result information includes an expected bit error rate and frame loss ratio.

The first test result such as the tested bit error rate and frame loss ratio of the optical communication module is compared against the expected result information such as the expected bit error rate and frame loss ratio, the optical communication module is determined as qualified if the tested bit error rate and frame loss ratio are lower than the expected bit error rate and frame loss ratio.

Optionally, the entire testing process of the testing method for optical communication module described above is integrated into a test device.

In this embodiment of the present disclosure, the complex test parameter configuration process is automatically completed because that the optimal test parameters corresponding to the optical communication module are obtained automatically based on the encoded information of the optical communication module, moreover, the whole test process, including bit error rate test and frame loss ratio test, is integrated into a test device, thus, complicated and time-consuming manual operations are avoided, time cost and labor cost spent on the process of testing the optical communication module are greatly saved, and the test efficiency of the optical communication module is improved.

Embodiment Two

Figure 2:
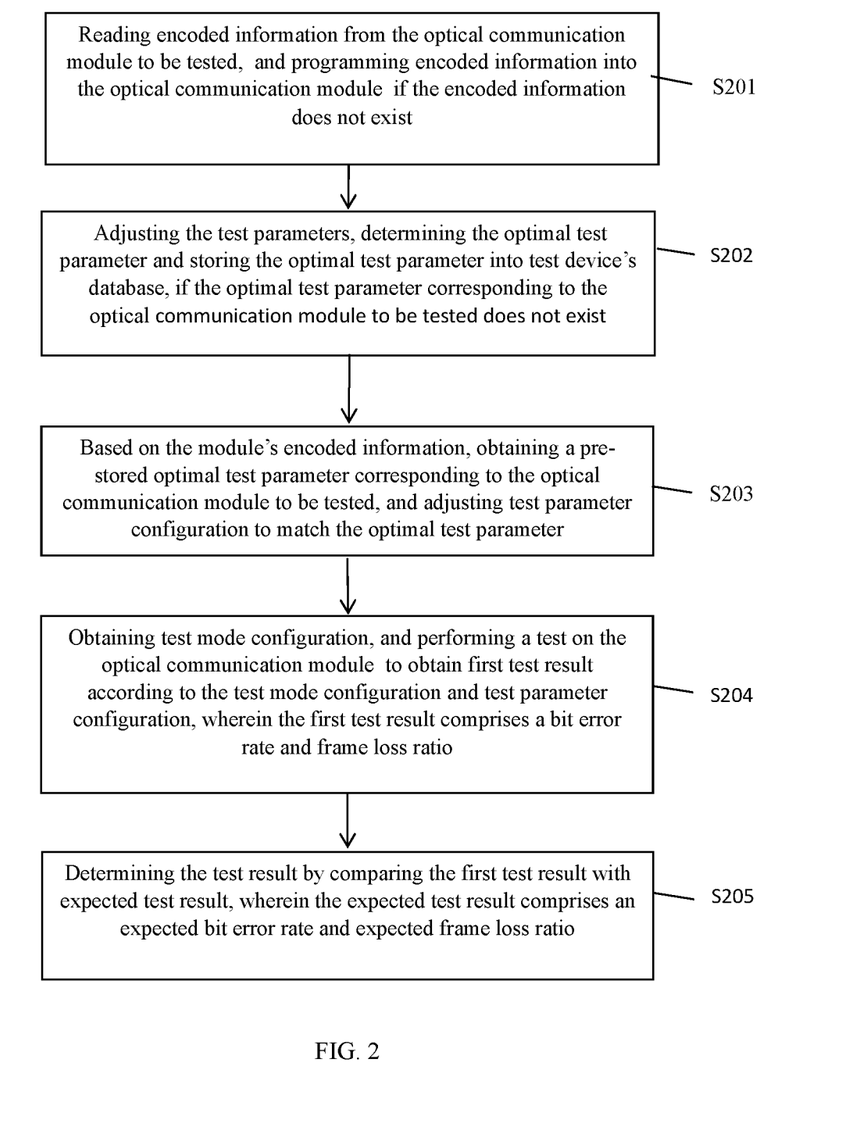
FIG. 2 illustrates a schematic flow chart of an implementation process of the second testing method for optical communication module according to the present disclosure.

FIG. 2 illustrates a schematic flow chart of a second testing method for optical communication module according to an embodiment of the present disclosure. The execution object of testing method for optical communication module according to the embodiment of the present disclosure is a test device, the second testing method for optical communication module is described in detail below:

In step S201, reading encoded information from the optical communication module to be tested, and programming encoded information into the optical communication module, if the encoded information does not exist.

the second testing method for optical communication module further includes:

receiving an input instruction and programming the encoded information into the optical communication module, if the encoded information of the optical communication module does not exist.

Testing to the optical communication module is performed after the encoded information is programmed into the optical communication module. If the encoded information of the optical communication module is detected to be not exist at the beginning of the test, then, the input instruction is received, and the encoded information is programmed into the optical communication module. The encoded information includes manufacture information of the optical communication module such as a manufacturer name, a component number, a serial number, a date of manufacture and the like, and type/model information of the optical communication module such as a package type, a transmission rate, and the like, and an execution program of the optical communication module (i.e., programming a preset driver code into the optical communication module such that the module functions).

In step S202, adjusting the test parameters, determining the optimal test parameter and storing the optimal test parameter into test device's database, if the optimal test parameter corresponding to the optical communication module to be tested does not exist.

if the optimal test parameter corresponding to the model of the optical communication module to be tested is not available in the database, the test parameters need to be adjusted so as to determine the optimal test parameter corresponding to this type of optical communication module and store the optimal test parameter into the database. Then, when another optical communication module having the same model (i.e., the same transmission rate, the same packaging type, manufacture ID, part number) is plugged into the test device for testing, the optimal test parameter may be looked up and obtained through the encoded information of the optical communication module, and configuring test parameters of the test device is automatically performed.

When fine tuning the test parameters, the optical communication module under test may be connected in a single port loopback manner. During parameter tuning, the length of the optical fiber for loopback should be equal to the maximum distance that the optical communication module can transmit.

Specifically, tuning the test parameters to determine the optimal test parameter corresponding to the optical communication module includes the following steps:

A1, determining test interface protocol as part of the optimal test parameter according to transmission rate from the encoded information of the optical communication module to be tested.

Test interface protocol for the optical communication module is determined according to the rate information in the encoded information of the optical communication module to be tested. For example, with regard to an optical communication module having a transmission rate of 10 Gbit/s, the test interface protocol of this optical communication module is configured as SFI, XFI; with regard to an optical communication module having a transmission rate of 25 Gbit/s, the test interface protocol of this optical communication module is configured as any one of 25GAUI, 25GBase-C, 25GBase-CR-S, 25GBase-CR; with regard to an optical communication module having a transmission rate of 40 Gbit/s, the test interface protocol of this optical communication module is configured as any one of XLAUI, XLPPI, 40GBase-CR4, XLAUUI2; with regard to an optical communication module having a transmission rate of 50 Gbit/s, the test interface protocol of this optical communication module is configured as any one of 50GAUI-1, 50GBase-CR, LAUI-2, 50GAUI-2, 50GBase-CR2; with regard to an optical communication module having a transmission rate of 100 Gbit/s, the test interface protocol of this optical communication module is configured as any one of 100GAUI-2, 100GBase-CR2, 100GAUI-4, 100GBase-CR4; with regard to an optical communication module having a transmission rate of 200 Gbit/s, the test interface protocol of this optical communication module is configured as any one of 200GAUI-4, 200GBase-CR4; with regard to an optical communication module having a transmission rate of 400 Gbit/s, the test interface protocol of this optical communication module is configured as any one of 400GAUI-8, 40GBase-CR8.

A2, automatically adjusting test interface setting parameters within a preset parameter adjustment range.

The setting parameters of the test interface include a transmission voltage amplitude, finite impulse response filters setting at the transmitter of the test interface and a reception equalization parameter at the receiver of the test interface. The combined effect of the parameters reflects an estimated common SerDes characteristics of the major networking devices where the optical communication module expects to attach to. The SerDes characteristics are determined by form factors and silicon of the networking devices, wherein, the form factors refer to PCB board size, PCB material, port speed and estimated longest and shortest SerDes trace lengths. Based on the estimated common SerDes characteristics, an adjustment range for each of these parameters is determined and each parameter may be adjusted according to a preset step size within the adjustment range.

A3, detecting whether a link is established in the test path, if the link is not established in the test path, returning to the step A1 to verify if the test interface protocol is correctly configured, returning to the step A2 to check if the test interface setting parameter is finely adjusted; otherwise, entering a step A4.

The test path refers to the entire transmission path of test signal in the testing process, starting from the transmitter of the test interface at the test device, to the optical communication module under test, to the receiver of the test interface at the test device. A test signal may be generated and sent by the test device and the signal should return to the test device within a preset time, if the signal is received correctly, it indicates that a link is established in the test path and signal can pass through.

A4, sampling the receiving signal of the test interface at the test device, and generating a two-dimensional digital eye diagram; entering step A5 if the digital eye diagram conforms to an expected eye pattern template, otherwise, returning to the step A2 in which the test interface setting parameter should be finely tuned further.

The expected eye pattern template is defined per MSA or corresponding industrial standards according to the speed and type of the optical communication module in testing. The receiving signal of the test interface at the test device is a signal which went through encoding, transmitting, decoding, and sending back to the testing device by the optical communication module, and the quality of the signal may reflect the quality of the optical communication module under test. A two-dimensional digital eye is generated according to the signal, and the digital eye diagram can only be opened and correctly displayed under certain quality of the receiving signal.

A5, following the adjustment steps based on A1 to A4, saving the parameters of test interface protocol and the test interface setting, and storing them as a set of optimal test parameters corresponding to the specific model of the optical communication module under test.

In step S203, based on the module's encoded information, obtaining a pre-stored optimal test parameter corresponding to the optical communication module to be tested, and adjusting test parameter configuration to match the optimal test parameter.

In this embodiment, the step S203 is the same as the step S102 in the embodiment one, regarding the detailed description of step S203, reference may be made to the relevant description of step S102 in the embodiment one, step S203 will not be repeatedly described here.

In step S204, obtaining test mode configuration, and performing a test on the optical communication module to obtain first test result information according to the test mode configuration and test parameter configuration, wherein the first test result comprises a bit error rate and frame loss ratio.

Optionally, the step S204 specifically includes:

obtaining the test mode configuration, obtaining packet configuration, and performing a test on the optical communication module according to the packet configuration and the test parameter configuration to obtain the first test result information, in the event that the test mode configuration is in an Ethernet traffic test.

When the test mode configuration is in Ethernet traffic test mode, the pre-set packet configuration is obtained, and the packet configuration determines Ethernet packet data stream generated by the test device, which includes a packet header, a source MAC address, a destination MAC address, a VLAN ID, a length of the packet, and load information. Optionally, when testing is performed under the Ethernet traffic mode, a line rate full pressure test is operated, for example, regarding an optical communication module having a transmission rate of 100 Gbit/s, an Ethernet packet data stream having a transmission rate of 100 Gbit/s may be set correspondingly so that the optical communication module is tested under 100% full loading. An Ethernet packet data stream is generated according to the packet configuration and test parameter configuration in the step S203, when the optical communication module has a loopback connection, the Ethernet packet data stream is transmitted, through the transmitter of a test interface, to the optical communication module under test where the packet data is encoded, transmitted and decoded by the optical communication module and is finally circled back to the receiver of the test interface at the test device, and the originally generated Ethernet packet data stream and the returned Ethernet packet data stream are analyzed and compared to obtain the first test result information, wherein the first test result information includes frame loss ratio of the optical communication module. For Ethernet traffic testing mode, the frame loss ratio=the number of lost packets divides the total number of transmitted packets×100%, wherein the number of lost packets=the total number of transmitted packets−the number of received packets+the received error packets.

Optionally, in the Ethernet traffic test mode, two test interfaces (i.e., the first test interface and the second test interface of the test device) may be interconnected with two optical communication modules (i.e., the first optical communication module and the second optical communication module) of the same model/type in a port-pair connection. The Ethernet packet data stream generated by the test device is sent to the first optical communication module through the transmitter of the first testing interface, then, the first optical communication module sends the Ethernet packet data stream to the second optical communication module, and the second optical communication module finally returns the Ethernet packet data stream to the test device through the receiver of the second testing interface. The frame loss ratio of the first optical communication module=the number of lost packets at test interface number two divides the total number of transmitted packets at test interface number one×100%, wherein the number of lost packets at test interface number two=the total number of transmitted packets at test interface one−the number of received packets at test interface two+the received error packets at test interface two. Similarly, the calculation of the frame loss ratio of the first optical communication module is also applicable for calculation of the frame loss ratio at the second optical communication module.

Optionally, if the test mode is the Ethernet traffic test, after obtaining the packet configuration, performing a test on the optical communication module to obtain the first test result according to the packet configuration and the test parameter configuration, the testing method further includes:

obtaining FEC (Forward Error Correction Coding) configuration and the packet configuration, and performing a test on the optical communication module according to the configurations of forward error correction, the packet configuration and the test parameter configuration to obtain the first test result, if the test mode configuration is in the Ethernet traffic test mode.

Under the Ethernet traffic test mode, forward error correction coding configuration is obtained, and the forward error correction coding configuration includes "turned on" and "turned off". When the FEC is "turned on" at the test device, a forward error correction coding function is turned on, a test on the optical communication module is performed, and the frame loss ratio of the optical communication module is obtained under FEC enabled situation; when the forward error correction coding configuration is "turned off", the forward error correction coding function is "turned off", a test on the optical communication module is performed, and the first test result shows the optical communication module's raw frame loss ratio and reflects the native transmission quality without FEC.

Due to the fact that in real-life applications, FEC is usually turned on at the network devices where the optical communication module is plugged in and works with, therefore, it is meaningful to perform the test at the test device with FEC enabled, and obtain the frame loss ratio of the optical communication module under FEC enabled situation.

Optionally, the step S204 specifically includes:

obtaining test mode configuration, obtaining polynomial constant configuration of a pseudo-random binary sequence, and performing a test on the optical communication module according to the configurations of polynomial constant and the test parameter to obtain first test result, if the test mode configuration is in a pseudo-random bit stream test mode.

When the test mode configuration is the pseudo-random binary sequence test mode, polynomial constant configuration of a pseudo-random binary sequence which is preset or input by a user is obtained, and the polynomial constant configuration of the pseudo-random binary sequence determines the order of the pseudo-random binary sequence generated by the test device. A specific pseudo-random binary sequence is generated according to the polynomial constant configuration and the test parameter configuration in the step S203; when the optical communication modules have a loopback connection, the bit stream is sent, through the transmitter of the test interface, to the optical communication module to be tested where the bit stream is encoded, transmitted and decoded, and is finally returned to the test device through the receiver of the test interface, and analysis and comparison are performed to obtain the first test result information, wherein the first test result information includes bit error rate. In the pseudo-random binary sequence test mode, the bit error rate of the optical communication module is calculated according to the number of error bits, test duration and test rate.

In step S205, obtaining a determination result according to the first test result and the expected result, wherein the expected result includes an expected bit error rate and frame loss ratio.

The first test result information such as the actual bit error rate and frame loss ratio of the optical communication module under test is compared with the expected result information, the optical communication module under test is determined as qualified if the actual bit error rate and the actual frame loss ratio are lower than the expected bit error rate and the expected frame loss ratio.

Optionally, the first test result further includes a digital signal eye diagram, in this case, the expected result further includes an expected eye pattern template.

When the optical communication module is under test, the digital signal eye diagram is generated by sampling the receiving signals at the receiver of the test interface. The digital signal eye diagram can be used to qualitatively determine the quality of the receiving signals at the receiver of the test interface, so as to reflect the quality of the optical communication module under test. In this case, the expected result information further includes an expected eye pattern template, the optical communication module to be tested is determined as qualified if the tested bit error rate and the tested frame loss ratio are lower than the expected bit error rate and the expected frame loss ratio and the digital signal eye diagram included in the first test result conforms to the expected eye pattern template.

Optionally, after the step of obtaining determination result according to the first test result information and the expected result information, this method further includes:

storing the test information into a database, wherein the test information at least includes the encoded information of the optical communication module, the first test result information, and the determination result.

The test device is integrated with the database, after optical communication module is tested, the testing information such as the encoded information, the first test result and the determination result of the specific optical communication module is stored into database, which facilitates subsequent queries of the history test information of the test device. Optionally, the test information may also include test time, test duration, test parameter configuration, test environment temperature, and other information.

In this embodiment of the present disclosure, since the test parameters corresponding to the optical communication module are automatically stored, retrieved and adjusted, a complete parameter adjustment only needs to be performed once for a specific type/model of optical communication module, which enables the optimal test parameter corresponding to this model to be directly obtained in a subsequent test, relevant test parameter adjustment is automatically performed according to the optimal parameter, and the test efficiency of the optical communication module is further improved.

It should be understood that, the ordering of steps in the aforesaid embodiments doesn't mean the sequence of execution, and the execution sequence of each of the steps should be determined by functionalities and internal logic, should not constitute any restriction on the implementation process of the embodiments of the present disclosure.

Embodiment Three

Figure 3:
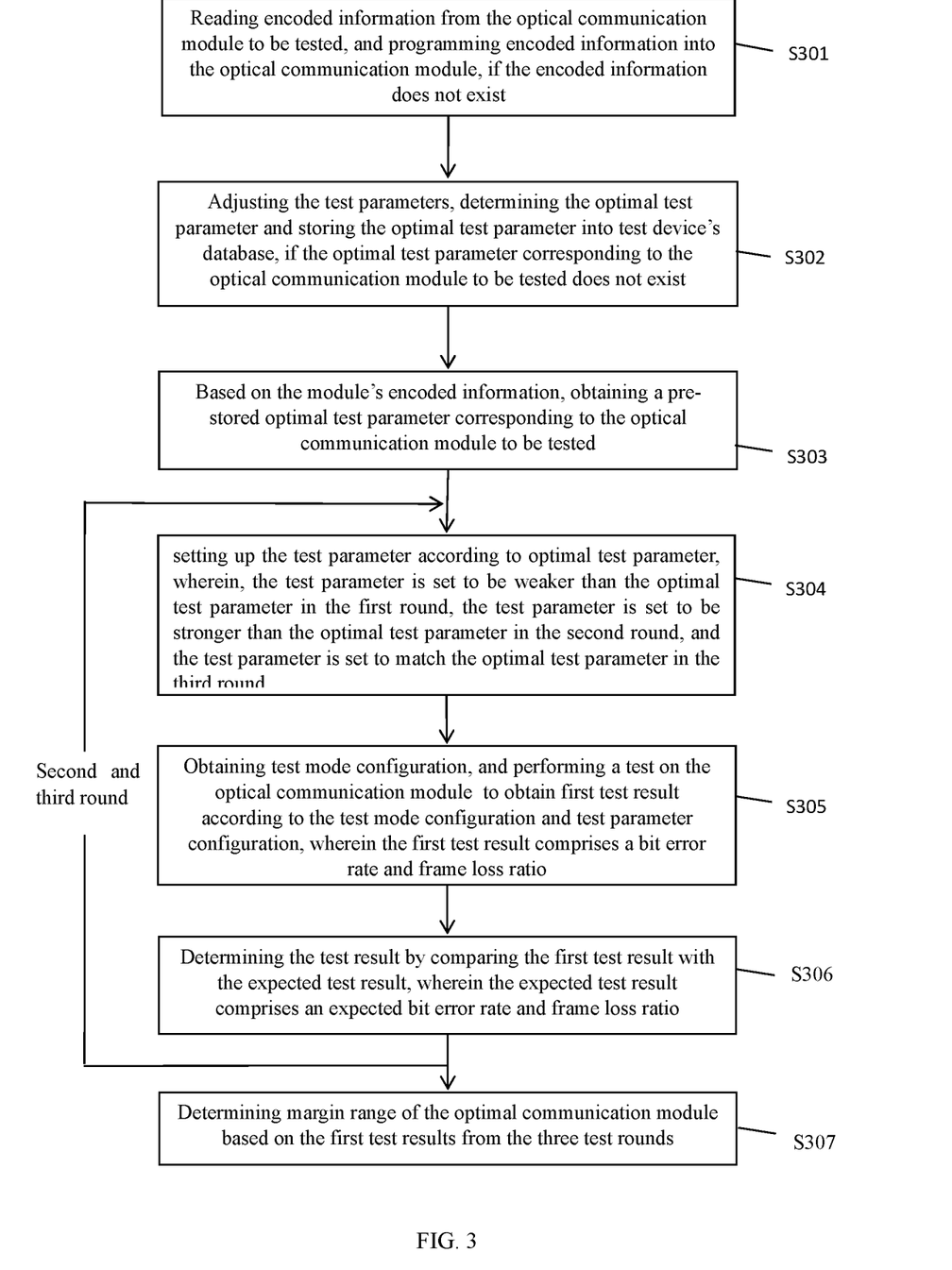
FIG. 3 illustrates a schematic flow chart of an implementation process of the third testing method for optical communication module according to the present disclosure.

FIG. 3 illustrates a schematic flow chart of a third testing method for optical communication module according to an embodiment of the present disclosure. The execution object of the testing method for optical communication module according to the embodiment of the present disclosure is a test device, the third testing method for optical communication module is described in detail below:

In step S301, reading encoded information from the optical communication module to be tested, programming encoded information into the optical communication module, if the encoded information does not exist.

In step S302, adjusting the test parameters, determining the optimal test parameter and storing the optimal test parameter into test device's database, if the optimal test parameter corresponding to the optical communication module to be tested does not exist.

In the present embodiment, the step S301 and the step S302 are the same as the step S201 and S202 in the embodiment two, respectively, referring the detailed description of the step S301 and step S302, reference can be made to the relevant descriptions of the step 201 and the step 202, the detailed description of the step S301 and step S302 will not be repeatedly described here.

In step S303, obtaining a pre-stored optimal test parameter corresponding to the optical communication module to be tested based on the module's encoded information.

As similar as step S102 and step S203, the optimal test parameter corresponding to the optical communication module under test may be obtained by lookup a matching table at database of the testing device. The table records the mapping relation between model information based on the encoded information and corresponding optimal test parameters.

In step S304, setting up the test parameter according to optimal test parameter, wherein, the test parameter is set to be weaker than the optimal test parameter in the first round, the test parameter is set to be stronger than the optimal test parameter in the second round, and the test parameter is set to match the optimal test parameter in the third round.

The test parameter specifically refers to a transmission voltage amplitude and finite impulse response filters setting at the transmitter of the test interface. The combined effect of the parameters is indicated by a dB value which reflects transmission strength from the transmission end of the test interface to the optical communication module and is calculated by an equation with the test parameters as inputs. The equation is implementation specific and varies from case to case.

The optimal test parameter has a corresponding strength value in dB. In order to test the margin range of the optical communication module, three rounds of testing are conducted. During the first round, the test parameters is adjusted to be a few percentage lower than the optimal parameter's dB value. During the second round, test parameters is adjusted to be a few percentage higher than the optimal parameter's dB value. Furthermore, the test parameters is set up to be exactly same as optimal parameter in the third round.

For each round of test, once the test parameter is correspondingly adjusted, step S305 is continued to be performed to complete the test of this round.

In step S305, obtaining test mode configuration, and performing a test on the optical communication module to obtain first test result information according to the test mode configuration and test parameter configuration, wherein the first test result includes a bit error rate and frame loss ratio.

In step S306, determining the test result by comparing the first test result with the expected test result, wherein the expected test result includes an expected bit error rate and frame loss ratio.

In this embodiment, the step S305 and the step S306 are the same as the step S103 and S104 in the embodiment one respectively, referring the detailed description of the step S305 and step S306, reference can be made to the relevant descriptions of the step S103 and step S104, the detailed description of the step S305 and step S306 will not be repeatedly described here.

In step S307, determining a margin range of the optimal communication module under test.

The margin range of the optical communication module is determined based on the first test results from the three rounds. The module's margin is rated as good if all the three tests are passed, the module's margin is rated as normal if two of the three tests are passed, and the module's margin is rated as poor if the test is only passed under optimal test parameter in third round. The rating of margin can be qualitatively used as indicator to the degree of interoperability for the optical communication module under test.

Embodiment Four

Figure 4:
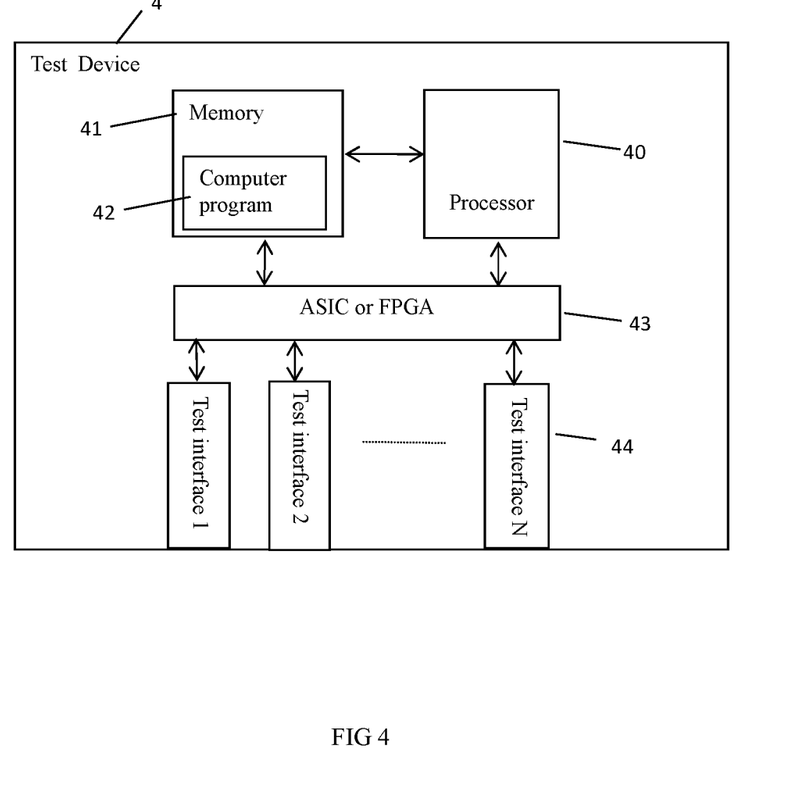
FIG. 4 illustrates a structural block diagram of the test device provided by the present disclosure.

FIG. 4 illustrates a structural block diagram of a test device according to an embodiment of the present disclosure. As shown in FIG. 4, the test device 4 in this embodiment includes a processor 40, a memory 41, and a computer program 42, ASIC or FPGA component 43 and a plurality of test interfaces 44. The computer program 42 is stored in the memory 41 and executed on the processor 40, and functions as a test program of optical communication module. The processor 40 is to execute the computer program 42 and manage the ASIC or FPGA component 43 so as to implement the steps in the various embodiments of testing methods for optical communication module, such as the steps S101-S104 shown in FIG. 1, S201-S205 in FIG. 2 and S301-S307 in FIG. 3.

The test device 4 may include but is not limited to: the processor 40, the memory 41, ASIC (Application Specific Integrated Circuit) or FPGA (Field Programmable Gate Array) component 43 and a plurality of test interfaces 44. The person of ordinary skill in the art may be aware of the fact that, FIG. 4 is merely an example of the test device 4, and does not constitute as limitation to the test device 4, more or less components shown in FIG. 4 may be included, or some components or different components may be combined; for example, the test device 4 may also include an input and output device, a network access device, a bus, etc.

The so called processor 40 may be CPU (Central Processing Unit), and may also be other general purpose processor. The general purposed processor may be a microprocessor, as an alternative, the processor may also be any conventional processor and so on.

The memory 41 may be an internal storage unit of the test device 4, such as a hard disk or a memory of the test device 4. The memory 41 can also be an external storage device of the test device 4, such as a plug-in hard disk, a SMC (Smart Media Card), a SD (Secure Digital) card, a FC (Flash Card) equipped on the test device 4. Further, the memory 41 may not only include the internal storage unit of the test device 4 but also include the external storage device of the test device 4. The memory 41 is configured to store the computer program, database, and other procedures and data needed by the test device 4. The memory 41 may also be configured to store data that has been output or being ready to be output temporarily.

Component 43 is ASIC or FPGA, or be some other programmable logic devices, discrete gate or transistor logic device, etc, which is configured or programmed by processor 40 to perform a test on the optical communication module according to the test mode and the test parameter configuration. It adjusts the test parameters of test interfaces 44, turns on or off FEC based on test mode, generates traffic test streams towards all the test interfaces with optical communication modules plugged in, analyzes the receiving test streams and determines the first test result together with processor 40. The first test result includes bit error rate and frame loss ratio.

The plurality of test interfaces 44 are configured to accommodate and attach with host sides of optical communication modules to be tested. A test interfaces is configured according to test parameters, and when the optimal test parameter is applied, it emulates the estimated common SerDes characteristics of networking devices which the optical communication module is expected to work with in real-life applications. The test device in this embodiment of the present disclosure may perform tests on a plurality of optical communication modules simultaneously, for example, 32 optical communication modules or 128 optical communication modules may be tested simultaneously, and the process of the testing method for optical communication module is the same as the testing method for optical communication module as described in the embodiment one, embodiment two or embodiment three.

In the aforesaid embodiments, the description of each of the embodiments is emphasized respectively, regarding a part of one embodiment which isn't described or disclosed in detail, reference can made to relevant descriptions in other embodiments.

The person of ordinary skill in the art may be aware of that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present disclosure.

As stated above, the aforesaid embodiments are only intended to explain but not to limit the technical solutions of the present disclosure. Although the present disclosure has been explained in detail with reference to the above-described embodiments, it should be understood by the ordinary skilled one in the art that, the technical solutions described in each of the embodiments mentioned above can still be amended, or some technical features in the technical solutions can be replaced equivalently; these amendments or equivalent replacements, which doesn't cause the essence of corresponding technical solution to be broken away from the spirit and the scope of the technical solution in various embodiments of the present disclosure, should all be included in the protection scope of the present disclosure.

What is claimed is:

1. A testing method for optical communication module, performed on a test device, comprising:
   reading encoded information from the optical communication module to be tested;
   obtaining a pre-stored optimal test parameter corresponding to the optical communication module to be tested, and setting up a test parameter of the test device according to the obtained optimal test parameter; wherein the test parameter is set to match the optimal test parameter exactly for normal test or purposely deviates from the optimal test parameter when measuring a margin range of interoperability;
   obtaining test mode configuration, and performing a test on the optical communication module to obtain first test result according to the test mode configuration and test parameter configuration, wherein the first test result comprises a bit error rate and frame loss ratio; and
   obtaining a determination result according to the first test result and expected result, wherein the expected result information comprises an expected bit error rate and an expected frame loss ratio.

2. The testing method for optical communication module according to claim 1, further comprising:
   programming the encoded information into the optical communication module if the encoded information of the optical communication module does not exist.

3. The testing method for optical communication module according to claim 1, further comprising:

adjusting the test parameters, determining the optimal test parameter and storing the optimal test parameter into the test device's database if the optimal test parameter corresponding to the optical communication module to be tested does not exist, wherein the optimal test parameter includes a test interface protocol, a transmission voltage amplitude and a finite impulse response filters setting at a transmitter of a test interface, and an equalization parameter at a receiver of the test interface;

setting up, according to the optimal test parameter, test interfaces of test devices to emulate estimated common SerDes characteristics of major networking devices where the optical communication module is expected to attach to in real-life applications.

4. The testing method for optical communication module according to claim 1, wherein the step of obtaining test mode configuration, and performing a test on the optical communication module to obtain first test result according to the test mode configuration and the test parameter configuration comprises:

obtaining test mode configuration, obtaining packet configuration, and performing a test on the optical communication module to obtain first test result information according to the packet configuration and the test parameter configuration, in the event that the test mode configuration is in an Ethernet traffic test mode.

5. The testing method for optical communication module according to claim 4, wherein the step of performing a test on the optical communication module to obtain first test result according to the packet configuration and the test parameter configuration, in the event that the test mode configuration is in an Ethernet traffic test mode comprising:

obtaining forward error correction configuration and the packet configuration, and performing a test on the optical communication module to obtain the first test result information according to configurations of the forward error correction, the packet configuration and the test parameter configuration, if the test mode configuration is in the Ethernet traffic test mode.

6. The testing method for optical communication module according to claim 1, wherein the step of obtaining test mode configuration, and performing a test on the optical communication module to obtain first test result according to the test mode configuration and the test parameter configuration comprises:

obtaining test mode configuration, and obtaining polynomial constant configuration of a pseudo-random binary sequence, and performing a test on the optical communication module to obtain the first test result information according to the polynomial constant configuration and the test parameter configuration, if the test mode configuration is in a pseudo-random binary sequence test mode.

7. The testing method for optical communication module according to claim 1, wherein the first test result information further comprises a generated digital signal eye diagram, and the expected result information further comprises an expected eye pattern template.

8. The testing method for optical communication module according to claim 1, further comprising:

storing the test information into a database after the step of obtaining a determination result according to the first test result and the expected result, wherein the test information at least includes the encoded information of the optical communication module, the first test result, and the determination result.

9. A test device, comprising a memory, a processor, a computer program stored in the memory and executed on the processor, an ASIC or FPGA programmed for traffic generation and analysis, and a plurality of test interfaces attached with host sides of optical communication modules to be tested, wherein the processor is configured to execute the computer program and manage the ASIC or FPGA component so as to implement steps of the testing method according to claim 1.

* * * * *